Aug. 17, 1954  E. C. CAMERON ET AL  2,686,572
ABSORPTION FILTER DEVICE

Filed Jan. 17, 1952  2 Sheets-Sheet 1

INVENTORS
ERIC C. CAMERON
BY  VERLE W. WOODS

ATTY.

Aug. 17, 1954    E. C. CAMERON ET AL    2,686,572
ABSORPTION FILTER DEVICE

Filed Jan. 17, 1952                             2 Sheets-Sheet 2

INVENTORS
ERIC C. CAMERON
VERLE W. WOODS
BY
*Freek Wells*
ATTY.

Patented Aug. 17, 1954

2,686,572

UNITED STATES PATENT OFFICE 2,686,572

ABSORPTION FILTER DEVICE

Eric C. Cameron and Verle W. Woods, Yakima, Wash., assignors to Crop King Company, a division of the Richey and Gilbert Company, Yakima, Wash., a corporation Application January 17, 1952, Serial No. 266,858

8 Claims. (Cl. 183—4.8)

The present invention relates to an absorption and adsorption filter device and in particular to the provision of a means for passing a liquid or gaseous fluid through a body of granular material for the purpose of removing by absorption or desorption undesirable vapors and gases from the fluid.

It is common practice today to utilize these granular adsorbent and absorbent materials in various liquid treating, refrigerating, air recovery and heating systems as a means to remove undesired constituents from the fluid. The usual arrangement is to provide a plurality of flat or round tubular containers of the granular material and to circulate the fluid by means of a fan or pump, or other fluid moving means through the individual containers of material. In the keeping of vegetables and fruits for example, it is well known that the removal of certain gases and vapors that accumulate in a closed space where these products are stored, will increase the time that the products may be kept in storage without deteriorating to the point of being unfit for use.

Activated carbon is generally used as the granular material and it can be regenerated and used over and over again. However, the present containers used for this material do not take the best advantages of the absorption characteristics of the granular material and they are difficult to handle in such a way as to obtain proper regeneration. Furthermore, the prior art devices of which we are aware, do not arrange the granular material in such a fashion as to obtain uniform contact of the air with the particles of material and to avoid the formation of free air passages through the material.

It is the particular purpose of the present invention to provide a novel container construction for loose granular material which provides adequate fluid contact with the particles of the material without segregating the material into numerous individual units.

It is also a purpose of the invention to provide a novel container construction for the absorbent material wherein the absorbent material may be maintained under a pressure in one direction to avoid formation of air gaps in the material, and the air or other fluid to be treated is passed through the absorbent material transversely to the direction of pressure.

Our invention contemplates the provision of a container of a body of the absorbent material which has therein air admitting units and air outlet units so arranged that the absorbent material may be placed in and emptied from the container without disturbing the inlets and outlets, and the container can be refilled quickly with a minimum of difficulty. The structure embodying our invention provides uniform thickness of the absorbent material between the air inlets and outlets.

The nature and advantages of our invention will appear more fully from the following description and the accompanying drawings wherein a preferred embodiment of the invention is shown. It should be understood, however, that the drawings and description are illustrative only and are not intended to limit the invention except insofar as it is limited by the claims.

Figure 1:
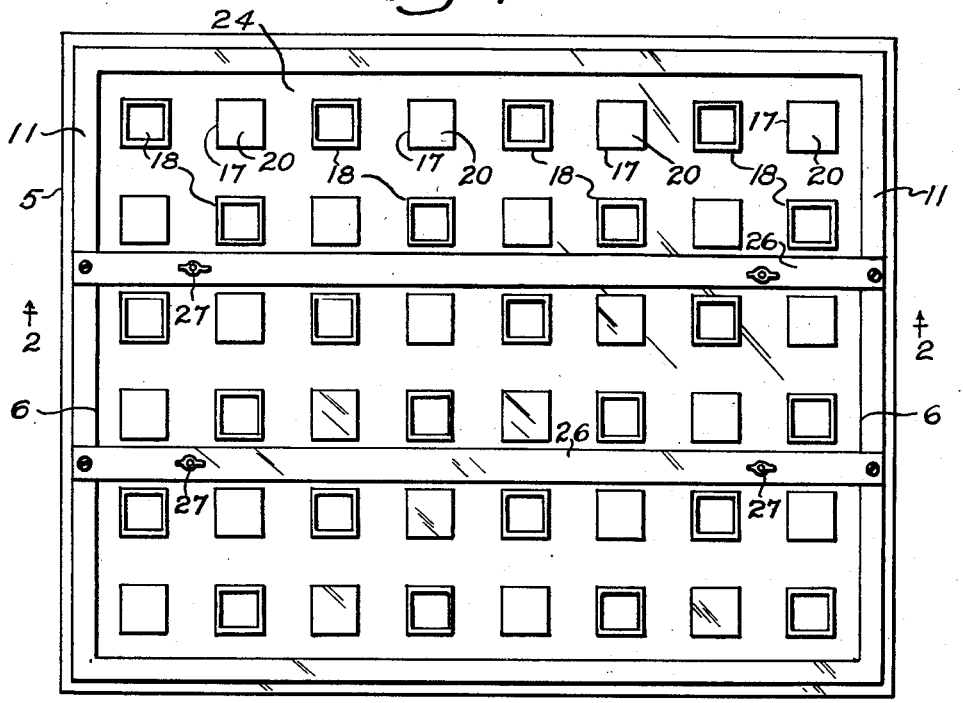
Figure 1 is a top plan view of an absorption filtering device embodying the invention.
Figure 3:
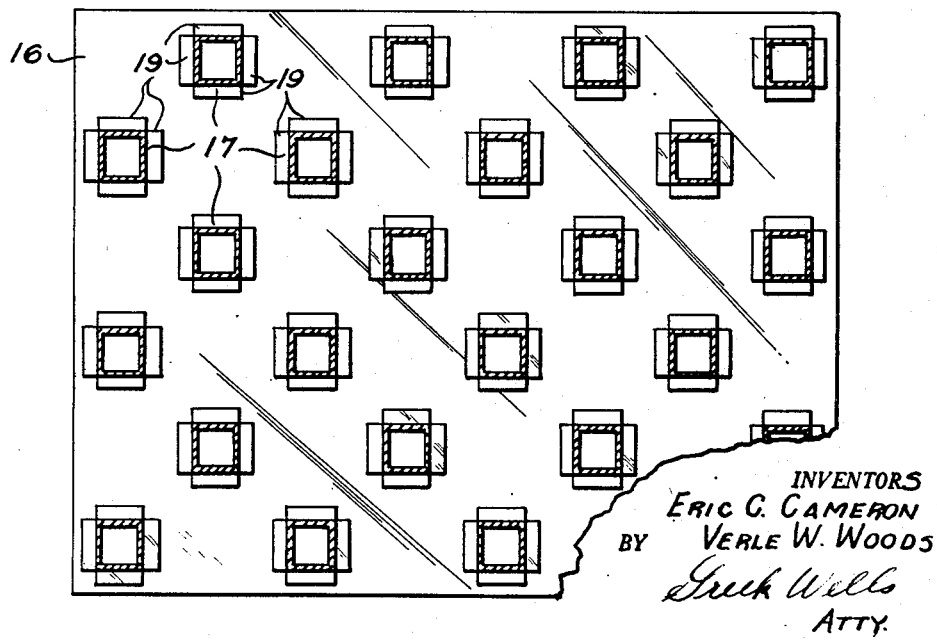
Figure 3 is a sectional view taken on the line 3—3 of Figure 2 with the air inlet members removed.

Referring now in detail to the drawings, our invention is shown as mounted in a portable housing 5 which provides space for mounting two containers 6 and 7 that carry the absorbent material. The housing 5 also carries a fan 8 and a motor 9 for driving the fan. An outlet 10 is provided to carry the air from the fan and the fan draws the air through the containers 6 and 7 in order to remove the objectionable vapors and gases. The casing of the fan 8 is shown with central openings at both sides and the outlet 10 of course, is tangential to the casing 8, as is customary in fans of this character.

The containers 6 and 7 are alike and will be described more fully hereinafter. The container 6 is seated in the top of the housing 5, a flange 11 being provided on the container and the housing having a ledge 12 on which the flange of the container seats. The container 7 is placed in the lower part of the housing 5, the housing being provided with a support 13 on which the container 7 can slide. A door 14 closes an inlet in the side wall of the housing 5 through which the container 7 is inserted. The assembly described hereinbefore is given merely as an example of how the absorption filter device embodied in containers 6 and 7 may be used. Various other assemblies of the container may, of course, be provided within the scope of our invention.

The absorbent material container such as 6 and 7 has a portion 15 turned in at the end opposite the flange 11 to serve as a support for a plate 16. The plate 16 forms a base upon which a plurality of perforated tubular members 17 and 18 rest. These members are square in cross section and are flanged as indicated at 19 to rest on the plate 16. The members 17 are closed or imperforate at their ends opposite the flanges 19 as indicated at 20 in Figures 1 and 2. The members 18 on the other hand are open at the ends opposite the flanges 19. The members 17 and 18 are spaced apart equal distances in both directions and alternate throughout the entire container so that each member 17 is surrounded by four members 18 except adjacent to the wall of the container 6. The plate 16 has an aperture 21 aligned with each of the members 17 but is closed beneath each of the members 18.

In order to hold the several members 17 and 18 in position, a second plate 22 is laid over the flanges 19. The plate 22 is apertured for each of the members 17 and 18 and forms a bottom for the space around the members so that it may be filled with granular absorbent material indicated at 23. Another plate 24 is inserted in the container 6 around the free ends of the members 17 and 18 and rests against the granular material 23, the members 17 and 18 extending through apertures in the plate 24. Pressure is applied on the granular material between the plates 22 and 24 by means of a plurality of springs 25 that are carried by cross bars 26. The cross bars 26 have their ends removably secured to the top flange 11 of the container 6. Bolts 27 suspend the plate 24 from the cross bars 26. The plate 24 can be removed for filling the container and emptying it by releasing the bars 26 from the container 6 and lifting them with the plate 24 and the springs 25.

The several members 17 and 18 are perforated with fine perforations throughout their length with the exception of a short portion at the closed ends 20 of the members 17. The perforations shown in the drawings are, of course, greatly enlarged. In actual practice the members 17 and 18 are about 1½ inches square in cross section and the perforations average about $\frac{1}{32}$ inch diameter and about 16 to the inch. They may be finer or larger, depending upon the nature of the absorbent material. For the commonly used activated carbon the size of perforations and the spacing just given is satisfactory. The number of members 17 and 18 in a particular container may, of course, be varied. The distance between members, however, is equal to the distance across the member. With this construction the air flowing through the container flows outwardly from the member by which it enters on all four sides of the member and it has an equal distance to flow to reach an outlet member in each direction. For example, in Figure 2, the air entering one of the members 18 from the top as indicated by the arrows, must flow laterally as indicated by the arrows, through the granular material to the four members 17 which are equally spaced about this particular member 18. Air can enter the member 17 only by passing through the granular material since the top 20 of this member is closed. Note that the arrangement just described serves to create a substantially uniform pressure differential across the granular material throughout the length of the member since the maximum entrance pressure is at the top of the member 18 and this pressure is gradually reduced toward the bottom of the member. Likewise the minimum pressure exists at the bottom outlet of the member 17.

The granular material does not become channeled with air passages in this device because the pressure of the plate 24 toward the plate 22 is transverse to the direction of air flow. This arrangement avoids any settling and leaving of air gaps in the granular material and insures practically uniform use of all of the granular material within the container 6.

Figure 2:
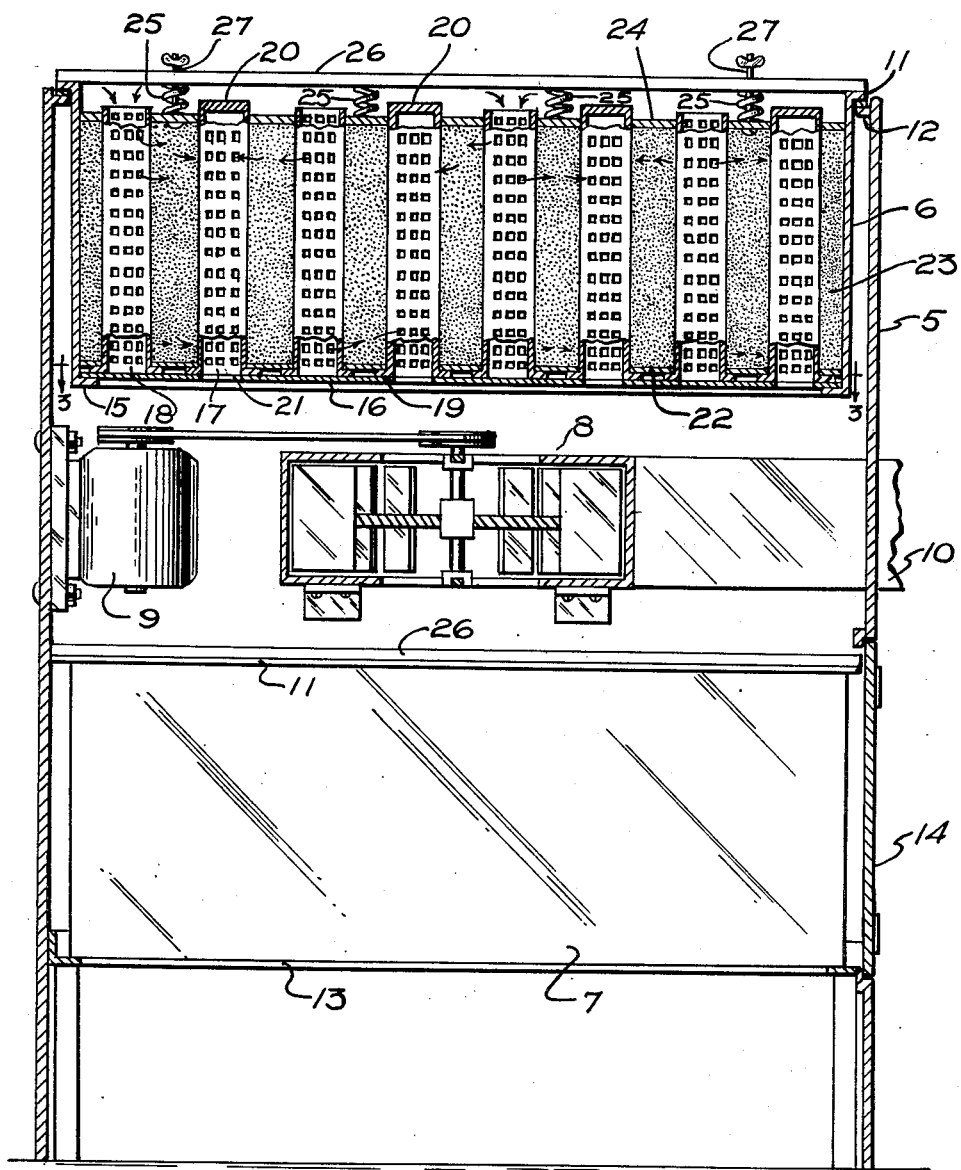
Figure 2 is a sectional view taken on the line 2—2 of Figure 1.

The present construction greatly facilitates the replacement of the absorbent material without delay. A container 6 or 7 can easily be removed and replaced with a fresh container. The granular material in the container is readily replaced by removing the top plate 24 and pouring the granulated material out. The container is then refilled with granular material, the cover plate 24 is replaced and the device is ready for operation. It is not necessary to be careful in filling the container because the granulated material getting into the members 18 through their open ends can be recovered after the plate 24 is in place by merely inverting the container 6. The containers 6 and 7 are shown in Figure 2 with the members 17 and 18 upright. It is obvious, however, that this is unnecessary. They may be placed in any position that is convenient for their use since the pressure on the granular material is always exerted croswise with respect to the air flow so as to keep the granular material from separating to produce air gaps.

It is believed that the nature and advantages of our invention will be apparent from the foregoing description. Having thus described our invention, we claim:

1. An absorption filter device comprising, in combination, a rectangular supporting container, a multiplicity of spaced apart parallel tubular members having perforate side walls, means supporting said members in said container, said members being square in cross section and each member being spaced from the others a distance substantially equal to the distance across a member, alternate members having only the ends thereof toward one face of the container open, the other members having only the ends toward the opposite face of the container open, the space in said container around said members being filled with a granular absorbent material, and means to apply pressure on said material lengthwise of the members.

2. A container for granular filter material such as activated carbon comprising in combination an outer shell, open at both ends, a multiplicity of spaced apart parallel tubular members having perforate side walls, means mounting the members in said shell including spacing means holding each member spaced from the others, alternate members having only the ends thereof toward one open end of the shell open, the other members having only the ends thereof toward the other open end of the shell open, said spacing means comprising plates apertured to receive said members and closing the space between said members and the space between said shell and members within said shell to form a container for granular filter material, and means urging said plates toward each other.

3. A container for granular filter material such as activated carbon comprising, in combination, an outer shell open at both ends, a plate seated in one end of said shell, a multiplicity of spaced apart parallel tubular members having perforate side walls, means mounting the members on said plate including spacing means holding each member spaced from the others, the space in said shell around said members being filled with a granular absorbent material, alternate tubular members having the ends thereof most remote from the plate closed and the other tubular members having the ends thereof most remote from the plate open, the plate having apertures therethrough opening into the tubular members having their remote ends closed.

4. A container for granular filter material such as activated carbon comprising, in combination, an outer shell open at both ends, a plate seated in one end of the shell, a multiplicity of spaced apart parallel tubular members of square cross section having perforate side walls, said members having flanges resting on said plate, a second plate apertured to receive said members and overlying the said flanges to hold each member spaced from the others, alternate tubular members having the ends thereof remote from the plates closed and the other tubular members having the ends thereof remote from the plates open, the space in said shell around said members being filled with a granular absorbent material, the first named plate having apertures therethrough opening into the tubular members having their remote ends closed, said first named plate closing the adjacent ends of the other tubular members.

5. In an absorption filter device of the character described, a container for granular absorbent material having a multiplicity of perforate tubular members arranged in spaced parallel alignment therein, said tubular members each having one end closed to the passage of air and the other end open, and adjacent members having their open ends facing in opposite directions, the space within the container around said tubular members providing a chamber to receive loose granular absorbent material.

6. In an absorption filter device of the character described, a container for granular absorbent material having a multiplicity of perforate tubular members arranged in spaced parallel alignment therein, said tubular members being square in cross section and being spaced apart a distance equal to the distance across a member, said tubular members each having one end closed to the passage of air and the other end open, and adjacent members having their open ends directed in opposite directions, the space within the container around said tubular members providing a chamber to receive loose granular absorbent material.

7. In an absorption filter device of the character described, a container for granular absorbent material having a multiplicity of perforate tubular members arranged in spaced parallel alignment therein, said tubular members each having one end closed to the passage of air and the other end open, and adjacent members having their open ends facing in opposite directions, said container including means applying pressure on the granular absorbent material around said members, in a direction lengthwise of said members.

8. In an absorption filter device of the character described, a container for granular absorbent material having a multiplicity of perforate tubular members arranged in spaced parallel alignment therein, said tubular members each having one end closed to the passage of air and the other end open, and adjacent members having their open ends facing in opposite directions, said container having two plates therein which plates engage and hold the members in spaced relation and means urging one of said plates toward the others, the space within the container around said tubular members providing a chamber to receive loose granular absorbent material.

References Cited in the file of this patent

UNITED STATES PATENTS

| Number | Name | Date |
| --- | --- | --- |
| 1,429,856 | Etter | Sept. 19, 1922 |
| 2,214,737 | Dauphinee | Sept. 17, 1940 |
| 2,303,334 | Dauphinee | Dec. 1, 1942 |

FOREIGN PATENTS

| Number | Country | Date |
| --- | --- | --- |
| 415,801 | Great Britain | Sept. 6, 1934 |
| 525,851 | Great Britain | Sept. 15, 1940 |
| 812,635 | France | May 13, 1937 |